(12) United States Patent
Inamori et al.

(10) Patent No.: US 12,463,491 B2
(45) Date of Patent: Nov. 4, 2025

(54) MAGNETIZING YOKE (71) Applicant: HONDA MOTOR CO., LTD., Tokyo (JP)

(72) Inventors: Kazunari Inamori, Tokyo (JP); Haruhiko Takasaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/672,561

(22) Filed: May 23, 2024

(65) Prior Publication Data

US 2024/0396388 A1 Nov. 28, 2024

(30) Foreign Application Priority Data

May 25, 2023 (JP) ................................. 2023-085960

(51) Int. Cl.
*H02K 3/52* (2006.01)
*H02K 1/14* (2006.01)
(Continued)

(52) U.S. Cl.
CPC ............. *H02K 3/522* (2013.01); *H02K 1/148* (2013.01); *H02K 3/24* (2013.01); *H02K 3/345* (2013.01); *H02K 2203/09* (2013.01)

(58) Field of Classification Search
CPC ............ H02K 1/06; H02K 1/12; H02K 1/146; H02K 1/148; H02K 1/185; H02K 1/20; H02K 2201/09; H02K 2201/15
(Continued)

(56) References Cited

U.S. PATENT DOCUMENTS

| 11,418,091 B2 * | 8/2022 | Broomfield ............... H02K 3/12 |
| 2010/0187918 A1 | 7/2010 | Takahashi et al. |

(Continued)

FOREIGN PATENT DOCUMENTS

| JP | 2002-010607 A | 1/2002 |
| JP | 2009-072055 A | 4/2009 |
| WO | 2022/097261 A1 | 5/2022 |

OTHER PUBLICATIONS

Japanese Notice of Allowance Corresponding to JP Application No. 2023-085960, dispatched by the Japan Patent Office on Feb. 25, 2025, 3 pages.

*Primary Examiner* — Oluseye Iwarere
*Assistant Examiner* — Minki Chang
(74) *Attorney, Agent, or Firm* — Rankin, Hill & Clark LLP (57) ABSTRACT

The magnetizing yoke includes a base; a set of first segmented cores disposed on the base in a circumference, each of first segmented cores having a recess portion open inward in a radial direction corresponding to the circumference; a set of coil cartridges disposed inside the set of first segmented cores in the radial direction; and a set of positioning members positioning the set of coil cartridges relative to the base. Each of the coil cartridge includes: an insulator having a pair of walls facing each other in the radial direction; a coil disposed between the pair of walls; and a second segmented core including a protrusion received in the recess portion. The insulator, the coil, and the second segmented core are integral with each other. The set of positioning members prevent the set of coil cartridges from moving inward in the radial directions respectively. Each of coil cartridges is detachable from an assembly of the base, a first segmented core, and a positioning member.

10 Claims, 6 Drawing Sheets

(51) Int. Cl.
*H02K 3/24* (2006.01)
*H02K 3/34* (2006.01)

(58) Field of Classification Search
USPC ...... 310/216.004, 216.057–216.58, 216.079, 310/216.082, 216.129
See application file for complete search history.

(56) References Cited

U.S. PATENT DOCUMENTS

2013/0294899 A1* 11/2013 Jones ..................... F01D 9/00
415/177
2023/0421001 A1   12/2023 Miyoshi et al.

* cited by examiner

MAGNETIZING YOKE

CROSS-REFERENCE TO RELATED APPLICATIONS

This application claims priority to Japanese Patent Application No. 2023-085960, filed on May 25, 2023, the contents of which are incorporated herein by reference in their entirety.

BACKGROUND

The present invention relates to a magnetizing yoke that magnetizes an object to be magnetized.

The Japanese patent application publication No. 2009-072055 A, referred to as Patent Literature 1, describes a segmented stator in which an insulator is formed on a teeth side of a segmented core by using a resin, a pre-formed coil is fitted around a teeth portion, and a resin is molded around the pre-formed coil. A set of segmented stators is arranged annularly in an outer tube and secured by heating to constitute a stator of a motor.

SUMMARY

The apparatus including the stator and the outer tube described above can be used for a magnetizing yoke that magnetizes an object to be magnetized. In the apparatus of Patent Literature 1, in response to a pulse current energizing the coil, a radially inward force is exerted on the coil. In this configuration, the resin alone supports the coil against the force, which may cause the coil to be pushed out inward in the radial direction. This may cause a life span of the apparatus to be shortened. Further, the segmented core is press fitted in the stator, which causes replacement of the entire apparatus in the event of breakdown of the apparatus caused by burst, or other causes.

Certain embodiments of the present disclosure provide a magnetizing yoke with an improved product life span and capability of partial replacement of parts in the event of breakdown.

According to an embodiment of the present disclosure, the magnetizing yoke includes: a base; a set of first segmented cores disposed on the base in a circumference, each of the first segmented core having a recess portion open inward in a radial direction corresponding to the circumference; a set of coil cartridges disposed inside the set of first segmented cores in a radial direction; and a set of positioning members positioning the set of coil cartridges relative to the base. Each of coil cartridges includes: an insulator having a pair of walls facing each other in the radial direction; a coil disposed between the pair of walls; and a second segmented core including a protrusion received in the recess portion. The set of positioning members prevents the set of coil cartridges from moving inward in the radial direction respectively. The each of the coil cartridges is detachable from an assembly of the base, a first segmented core, and a positioning member.

According to the above embodiment, the magnetizing yoke prevents the coil from being pushed out to improve the product life span and allow the apparatus to be partially repaired in an event of breakdown.

DETAILED DESCRIPTION

The embodiment of the present disclosure will be described appropriately with reference to the drawings. In the description below, a circumferential direction and a redial direction indicate directions based on a base, more specifically, based on a set of positioning members, first segmented cores, and coil cartridges, which are annularly arranged on the base. A vertical direction indicates a direction based on a condition in which different members are set on the base that is placed on a floor.

Figure 1:
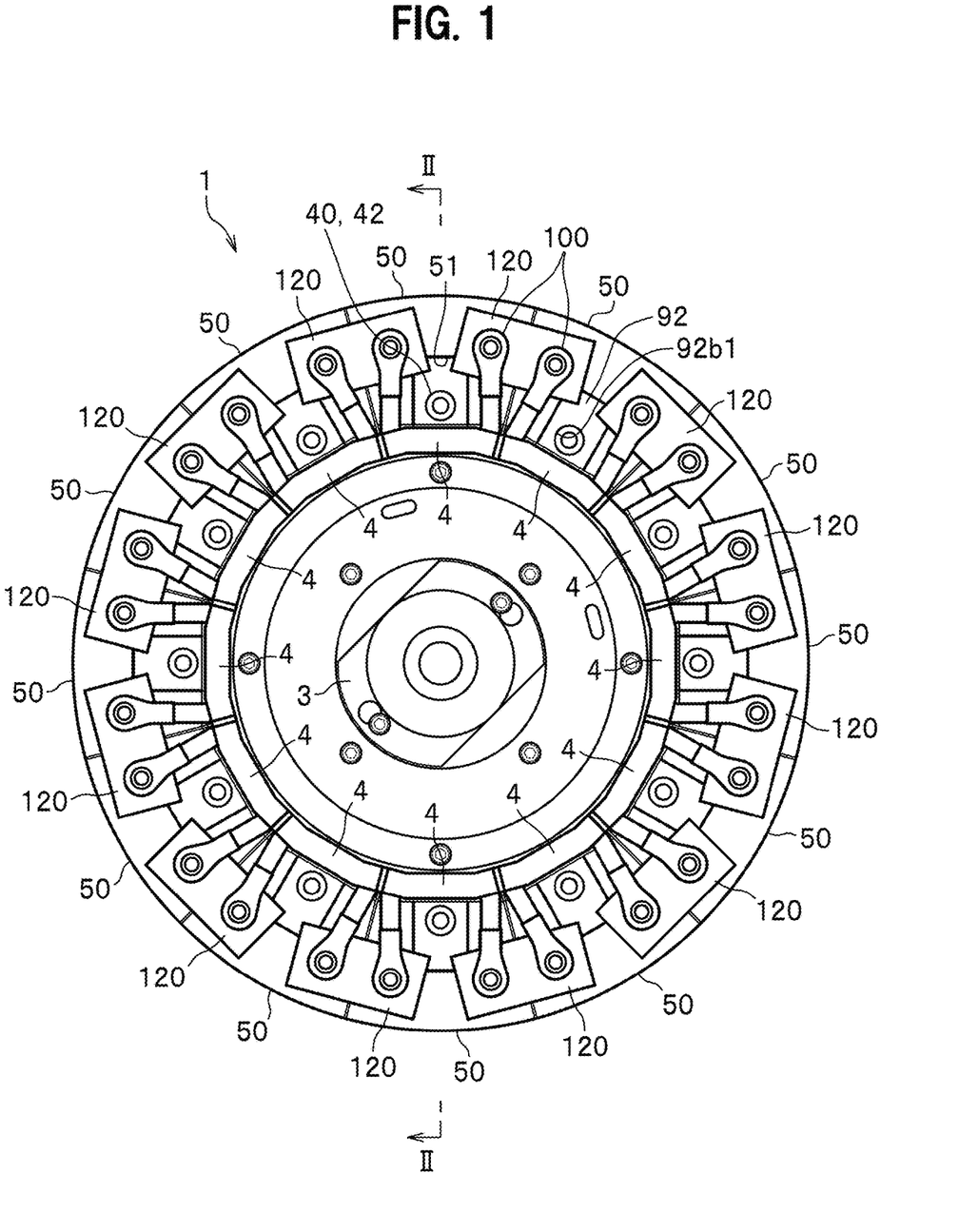
FIG. 1 is a plan view schematically showing a magnetizing yoke according to an embodiment of the present disclosure.
Figure 2:
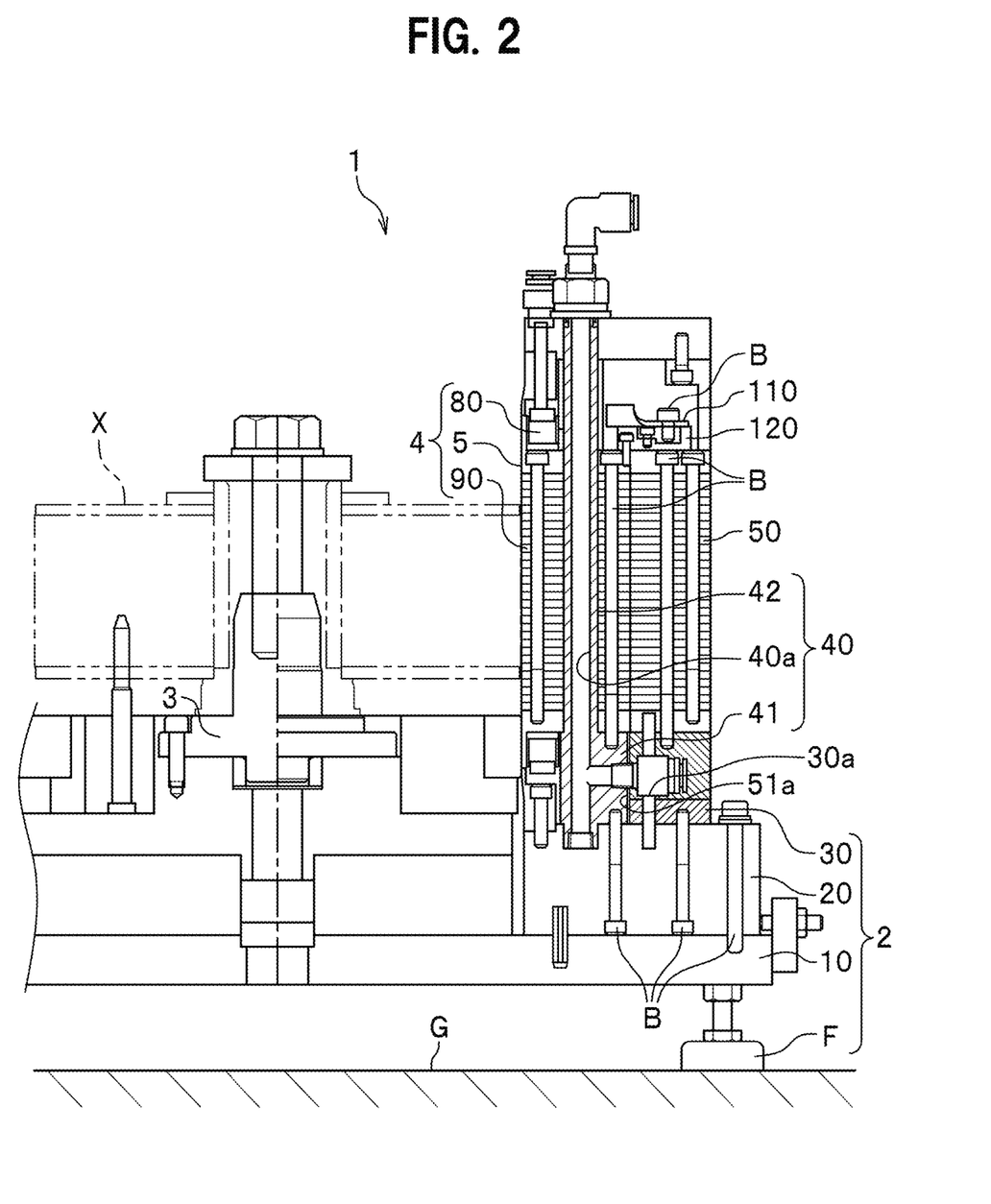
FIG. 2 is a cross-sectional view taken along a line II-II in FIG. 1, schematically showing the magnetizing yoke according to the embodiment of the present disclosure.

As shown in FIGS. 1 and 2, a magnetizing yoke 1 according to the embodiment of the present disclosure is an apparatus that magnetizes a magnet, or an object X to be magnetized, placed in a rotor of a motor. More specifically, the magnetizing yoke 1 is a ferromagnetic material manufacturing apparatus that produces an object (a ferromagnetic material) by magnetizing the object X that is initially being a paramagnetic material. The magnetizing yoke 1 includes a base 2, an object placement member 3, multiple sets of positioning members 40, first segmented cores 50, and coil cartridges 4, and a set of circuit parts 120.

In FIG. 1, members disposed above the positioning members 40, the first segmented cores 50, the coil cartridges 4, and the circuit parts 120 are omitted. In FIG. 2, only a second annular member 30 of the base 2 and the positioning members 40 are obliquely hatched for easily recognizing flow paths of a cooling medium.

(Base)

The base 2 is a part on which the first segmented cores 50 and the coil cartridges 4 for magnetizing are disposed. The base 2, made of a non-magnetic metal such as steel use stainless (SUS), is placed on a floor G. The base 2 includes: a circular plate 10 that is circular in a plan view; a first annular member 20 that is annular in a plan view and disposed concentrically on the circular plate 10; a second annular member 30 that is annular in a plan view and disposed concentrically on the first annular member 20; and a plurality of legs F that is disposed under the circular plate 10 and supports the circular plate 10 on the floor G.

The first annular member 20 is detachably attached to the circular plate 10 with bolts B. The bolts B of the present embodiment are made of a non-magnetic metal such as SUS. The second annular member 30 is detachably attached to the first annular member 20 with the bolt B. An inner diameter of the second annular member 30 is larger than that of the first annular member 20. The second annular member 30 includes a flow path 30a therein communicating with an annular flow path 40a, which is to be described below.

(Object Placement Member)

The object placement member 3 is a member on which a rotor of a motor, as the object X to be magnetized, is placed. The object placement member 3, made of a non-magnetic metal such as SUS, is disposed on the center of the circular plate 10. The shape of the object placement member 3 is appropriately modifiable according to a shape of the object X.

(Positioning Member)

Each positioning member 40 positions the first segmented cores 50 and the coil cartridges 4 on the base 2. Each positioning member 40, made of a non-magnetic metal such as SUS, rises from the radially inner portion of the first annular member 20. The positioning members 40 (12 parts in this embodiment) are arranged at the equal angular intervals (30 degrees in this embodiment) in a circumferential direction. Each positioning member 40 includes a pedestal 41 disposed on the first annular member 20 and a shaft 42 rises from the pedestal 41.

The pedestal 41, which is in substantially a rectangular parallelepiped, is positioned inside the second annular member 30 in a radial direction. The pedestal 41 positions the first segmented core 50 and prevents the corresponding first segmented core 50 from moving inward in a radial and circumferential directions.

The shaft 42 is hollow, and cylindrical in this embodiment. The shaft 42 positions the coil cartridge 4 and prevents the corresponding coil cartridge 4 from moving in a radial and circumferential directions.

The pedestal 41 and the shaft 42 define a flow path 40a therein, and the flow path 40a communicates with an annular flow path 30a formed in the second annular member 30. The flow path 40a allows cooling medium, such as water, to circulate therein.

(First Segmented Core)

Each first segmented core 50 is shaped in a substantially sector (a central angle of about 30 degrees in this embodiment), made of a magnetic metal such as SS4000 and SPC, and composed of vertically stacked iron plates. The first segmented cores 50 (12 cores in this embodiment) are arranged in a circumference direction. Each first segmented core 50 includes a recess portion 51 having an opening that faces inwardly in a radial direction. The recess portion 51 includes upper and lower ends that are open. The lower end of the recess 51 includes a positioned portion 51a having a shape corresponding to a shape of the pedestal 41 of the positioning member 40. That is, the radially inner portion of the first segmented core 50 is disposed on the first annular member 20 and the radially outer portion of the first segmented core 50 is disposed on the second annular member 30. The lower end of the radially outer portion of the first segmented core 50 is set higher than the lower end of the radially inner portion thereof.

(Coil Cartridge)

The coil cartridges 4 are arranged radially inside the first segmented cores 50 and cooperates with the first segmented cores 50 to magnetize the object X. The coil cartridges 4 (12 cartridges in this embodiment) are arranged in a circumferential direction. As shown in FIGS. 3 to 7, each coil cartridge 4 includes an insulator 5, an edgewise coil (coil) 80, a second segmented core 90, terminals 100, 100, and a resin member 110.

(Insulator)

Figure 5:
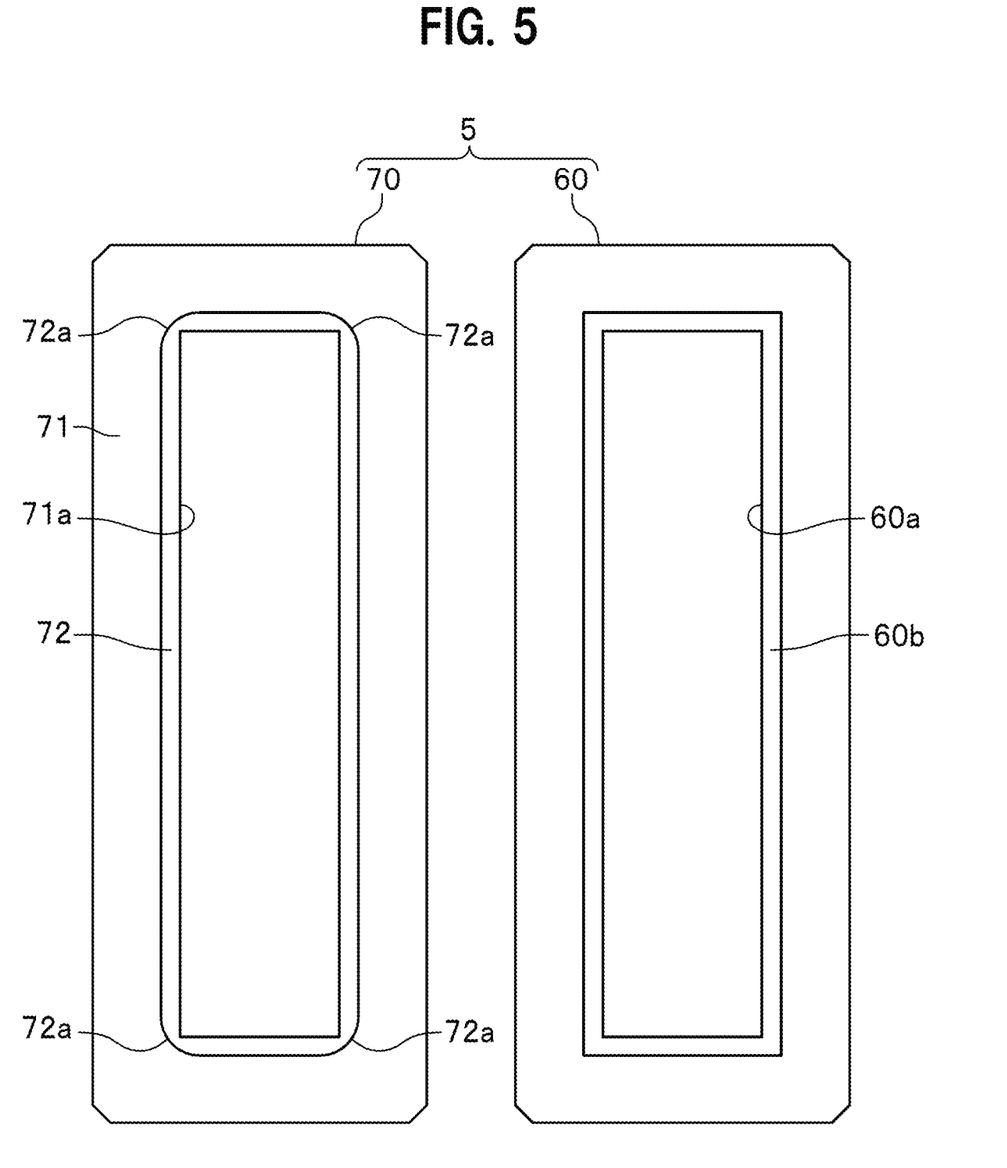
FIG. 5 is a view schematically showing an inner member and an outer member of an insulator according to the embodiment of the present disclosure.

The insulator 5, made of a resin, insulates the edgewise coil 80 from the first segmented core 50 and the second segmented core 90. As shown in FIG. 5, the insulator 5 includes an inner member 60 (a wall portion) and an outer member 70.

The inner member 60 constitutes a radially inner wall of the insulator 5. The inner member 60 includes a hole portion 60a with a shape corresponding to a tube portion 72 of the outer member 70, which is to be described below. The inner member 60 includes a step portion 60b formed on the radially inner surface of the inner member 60 at a radially inner periphery of the hole portion 60a.

The outer member 70 constitutes a radially outer part of the insulator 5. The outer member 70 includes a wall portion 71 at the radially outer side, facing the inner member 60, and a tube portion 72 extending radially inward from the wall portion 71. The wall portion 71 and the tube portion 72 are integral with each other. The wall 71 defines a hole portion 71a communicating with the tube portion 72.

The tube portion 72 is substantially rectangular in its axis view. The tube portion 72 has an end (an inner end in a radial direction) contacting with the periphery of the hole portion 60a. The end of the tube portion 72 can be fitted inside the hole portion 60a. The end of the tube portion 72 is fixed on the inner member 60 with adhesive (not shown). The tube member 72 includes an outer corner 72a with an R shape that corresponds to a shape of an inner corner 80a of the edgewise coil 80 in this embodiment. This structure can avoid a stress concentration on the outer corner 72a of the tube portion 72 and improve a product life span.

(Edgewise Coil)

Figure 4:
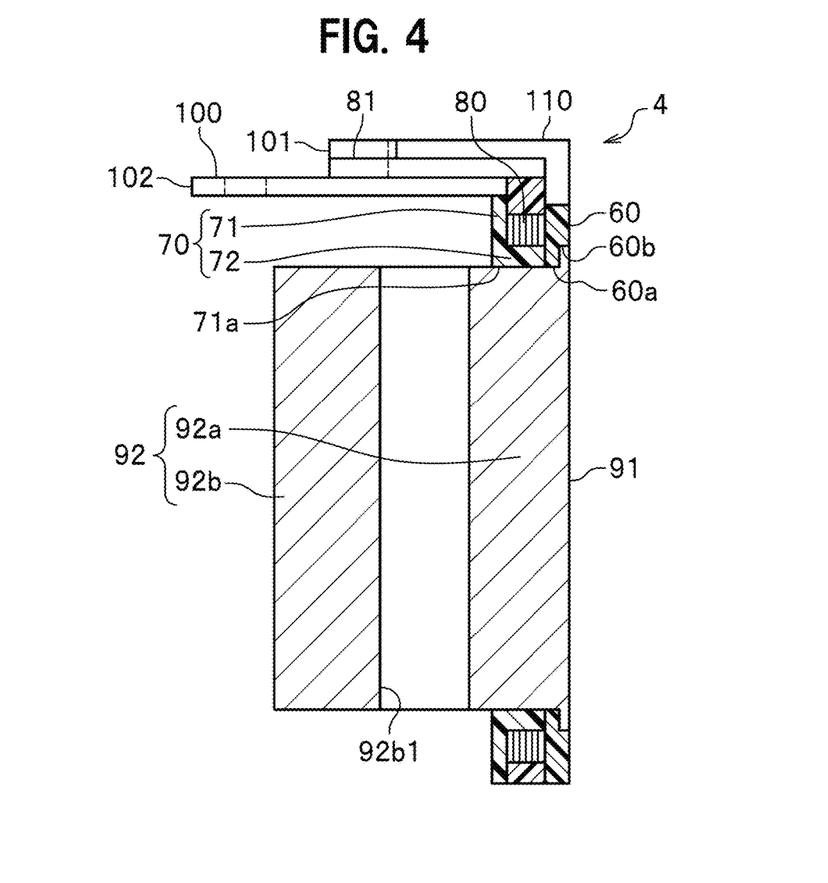
FIG. 4 is a cross-sectional view taken along a line IV-IV in FIG. 3, schematically showing the coil cartridge according to the embodiment of the present disclosure.
Figure 6:
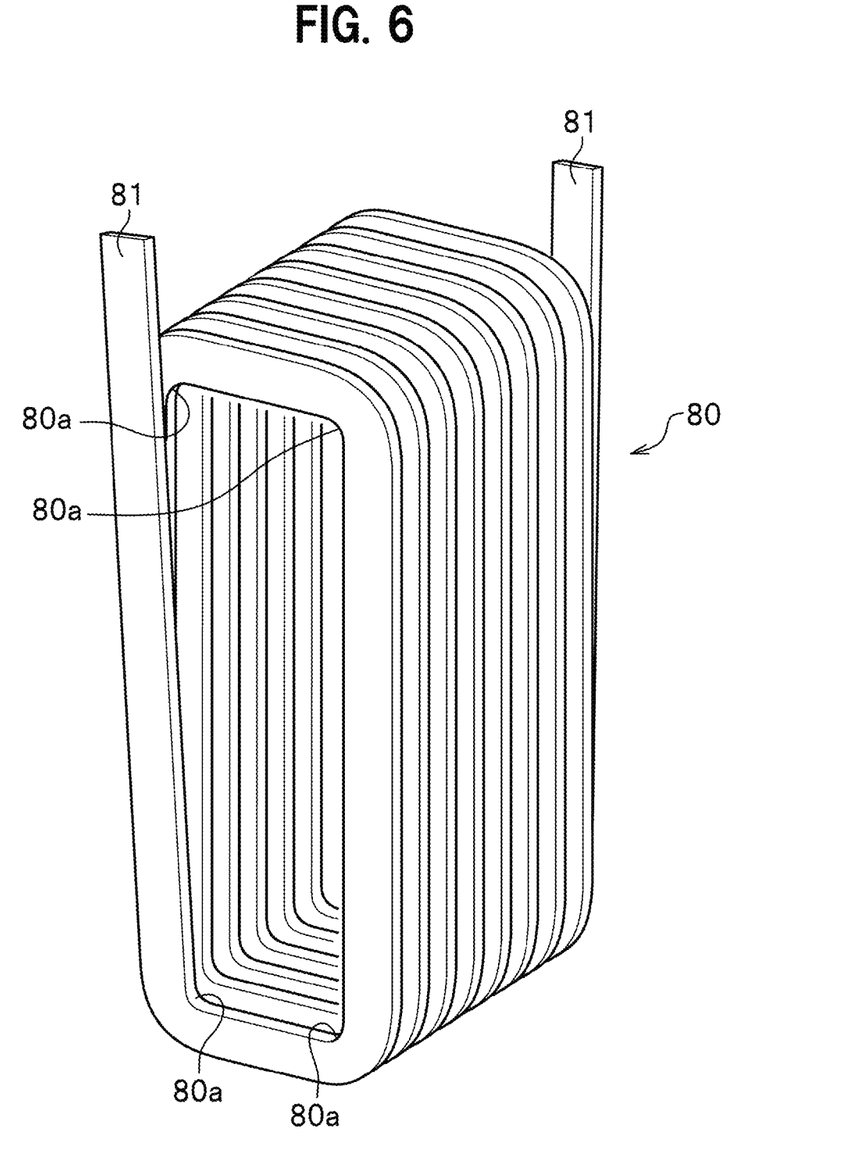
FIG. 6 is a perspective view schematically showing an edgewise coil according to the embodiment of the present disclosure.

As shown in FIG. 4, the edgewise coil 80 is fitted around the tube portion 72. As shown in FIG. 6, the edgewise coil 80 is a concentrated winding metal coil and independently set in each coil cartridge 4. The edgewise coil 80 is formed by bending a flat rectangular wire in an edgewise direction. As compared to a round wire, a flat rectangular wire ensures a larger cross-sectional area, which allows larger current to flow. The edgewise coil 80 has ends 81, 81, which are inserted in the proximal end of the terminal 100, which is to be described below, and fixed by crimping.

(Second Segmented Core)

Figure 7:
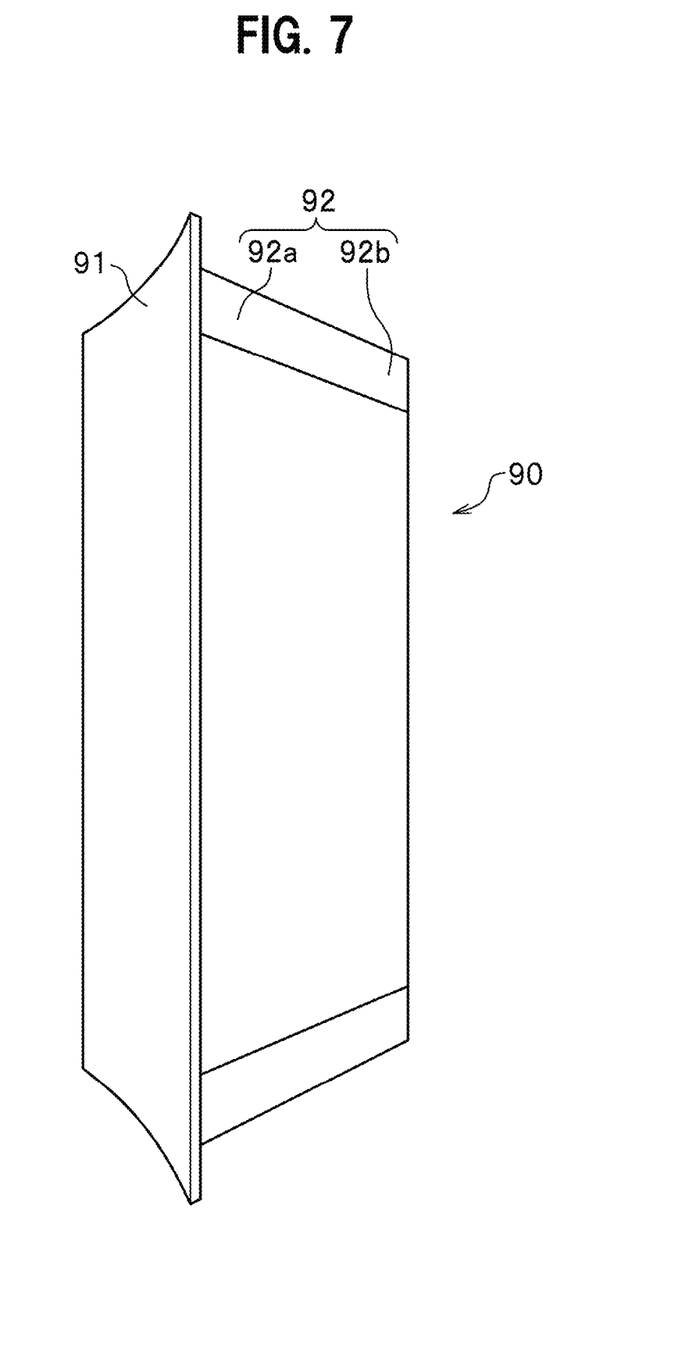
FIG. 7 is a perspective view schematically showing a second segmented core according to the embodiment of the present disclosure.

The second segmented core 90, made of a magnetic metal such as SS4000 and SPC, is composed of vertically stacked iron plates. The second segmented core 90 cooperates with the first segmented core 50 and serves as a core of the magnetizing yoke 1. As shown in FIG. 7, the second segmented core 90 integrally includes a flanged wall 91 and a broadly defined convex portion 92 extending radially outward from the flanged wall 91.

The flanged wall 91 is received in a recess portion, or the step portion 60b, of in the inner member 60.

The convex portion 92 includes a teeth portion 92a that is a proximal end portion (radially inner portion) and a distal end portion (radially outer portion) that is a narrowly defined convex portion, or a protrusion 92b.

The teeth portion 92a is a portion of the convex portion 92, which is inserted in the edgewise coil 80 or the tube portion 72.

The protrusion 92b is a portion of the broadly defined convex portion 92, which is received in the recess portion 51 of the first segmented core 50 so as to be exposed radially outward from the edgewise coil 80 or the tube portion 72. The protrusion 92b includes a through hole 92b1 vertically extending therethrough.

(Terminal)

Figure 3:
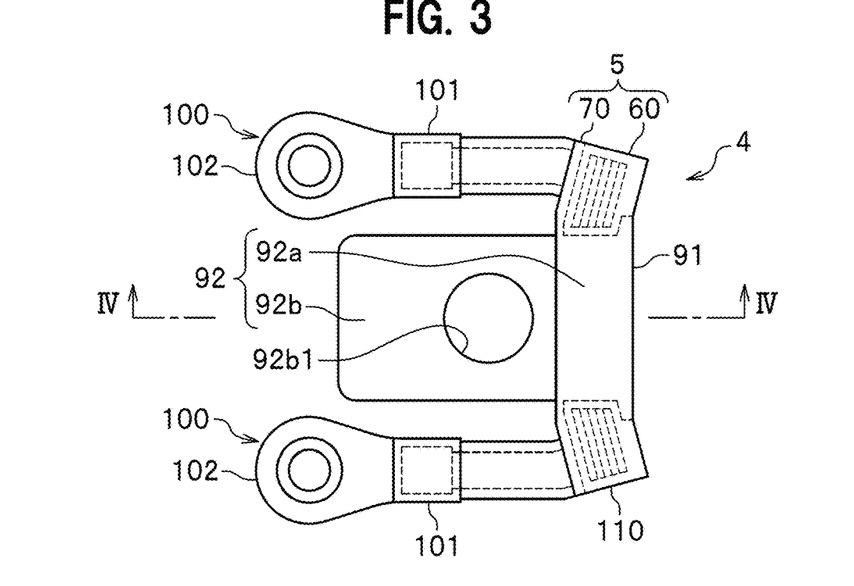
FIG. 3 is a plan view schematically showing a coil cartridge according to the embodiment of the present disclosure.

As shown in FIG. 3, the terminal 100, made of metal, electrically connects the edgewise coil 80 and the circuit part 120 to each other. The proximal end 101 of the terminal 100 has a shape that allows an end 81 of the edgewise coil 80 to be inserted into the proximal end 101. The terminal 100 further includes a distal end 102 that has a shape (like a hole) allowing the bolt B to be inserted into the distal end 102.

(Resin Member)

As shown in FIG. 4, the resin member 110, made of a thermosetting resin, covers the edgewise coil 80 between a pair of walls (the inner member 60 and the wall 71) of the insulator 5. The resin member 110 uncured, having a high viscosity (nearly 150 Pa*s), is applied on a desired part and then cures by heat. The resin member 110 fixes the insulator 5, the edgewise coil 80, and the terminals 100 in place and secures insulation between the neighboring edgewise coils 80.

(Circuit Part)

The circuit part 120 is disposed across the neighboring first segmented cores 50. The circuit part 120 is detachably secured to two distal ends 102 with the bolts B, one is of the terminal 100 of the coil cartridge 4 and the other is of the terminal 100 of the neighboring coil cartridge 4. The circuit part 120 is formed of a resin and a metal and has a part of a circuit to electrically connect the neighboring terminals 100 to each other, which are connected to the ends 81 of the edgewise coils 80 respectively. More specifically, the neighboring circuit parts 120 are electrically connected to each other with wirings. The circuit part 120 configures a circuit in cooperation with the edgewise coil 80 and the wirings to allow a pulse current to flow.

(Method of Assembling Coil Cartridge)

A method of assembling the coil cartridge 4 will be described below. First, an operator inserts the convex portion 92 of the second segmented core 90 into the hole portion 60*a* of the inner member 60 to receive the flanged wall 91 of the second segmented core 90 in the step portion 60*b* of the inner member 60. Next, the operator fits the edgewise coil 80 around the convex portion 92. Next, the operator inserts the tube portion 72 of the outer member 70 into a space between the convex portion 92 and the edgewise coil 80, and then secures the inner member 60 and the outer member 70 to each other with an adhesive. Next, the operator crimps the proximal end 101 of the terminal 100 to the end 81 of the edgewise coil 80. Next, the operator applies an uncured thermosetting resin to be cured so as to cover the edgewise coil 80 and the proximal end 101 of terminal 100, thereby forming the resin member 110.

(Method of Attaching Coil Cartridge)

A method of attaching the coil cartridge 4 to a set of parts including the base 2, the positioning member 40, and the first segmented core 50 will be described below. The operator inserts the shaft 42 of the positioning member 40 into the through hole 92*b*1 formed in the protrusion 92*b* of the coil cartridge 4 to place the coil cartridge 4 on the first annular member 20 of the base 2. In this embodiment, the insulator 5, the edgewise coil 80, and other parts of the coil cartridge 4 are located inside the first segmented core 50 in a radial direction and the protrusion 92*b* is disposed in the recess portion 51 of the first segmented core 50. The radially inner surface of the pedestal 41 of the positioning member 40 can be covered with the inner member 60 (the wall portion) of the insulator 5 or a resin wall member other than the insulator 5.

Next, the operator places the circuit part 120 on the first segmented core 50 and the protrusion 92*b* of the coil cartridge 4 and secures the circuit part 120 to the first segmented core 50 with the bolts B.

Next, the operator connects and secures the distal ends 102 of the terminals 100 of the coil cartridge 4 to the circuit parts 120 with the bolts B respectively.

(Method of Magnetizing Using Magnetizing Yoke)

Next, the method of magnetizing the object X using the magnetizing yoke 1 will be described. First, the operator sets the object X on the object placement member 3. Next, the operator manipulates an operation panel (not shown). According to the operation, a controller (not shown) makes a pulse current flow into the edgewise coil 80 of the coil cartridge 4 and activates a pump (not shown), thereby circulating the cooling medium through the flow path 40*a* of the positioning member 40. With this operation, the first segmented core 50, edgewise coil 80, and second segmented core 90 are cooled and a magnetic field in the first segmented core 50, the second segmented core 90, and the edgewise coil 80 is generated, thereby magnetizing the object X.

The inner member 60 (the wall portion) of the insulator 5 prevents the edgewise coil 80 from moving in a radially inward direction. In this embodiment, the flanged wall 91 of the second segmented core 90 prevents the inner member 60 of the insulator 5 from moving in a radially inward direction. Therefore, this structure prevents the edgewise coil 80 from moving in a radially inward direction under a force generated by the energization.

(Method of Replacing Coil Cartridge in Case of Failure)

When the edgewise coil 80 and/or the terminal 100 breakdown or burst caused by a pulse current generation, the operator can remove a broken terminal 100 of the coil cartridge 4 from the circuit part 120 and remove the protrusion 92*b* from the shaft 42 of the positioning member 40. This allows for replacement of the coil cartridge 4 alone having the broken edgewise coil 80 and/or the terminal 100.

(Functions and Effects)

According to the embodiment of the present disclosure, the magnetizing yoke 1 includes: a base 2; a set of first segmented cores 50 disposed on the base 2 in a circumference, each of first segmented cores 50 having a recess portion 51 open inward in a radial direction corresponding to the circumference; a set of coil cartridges 4 disposed inside the set of first segmented cores 50 in the radial direction; and a set of positioning members 40 positioning the set of coil cartridges 4 relative to the base 2. Each of coil cartridges 4 comprises: an insulator 5 having a pair of walls facing each other in the radial direction; a coil disposed between the pair of walls; and a second segmented core 90 having a protrusion 92*b* received in the recess portion 51. The set of positioning members 40 prevent the set of coil cartridges 4 from moving inward in radial directions respectively. Each of coil cartridges 4 is detachable from an assembly of the base 2, a first segmented core 50, and a positioning member 40.

Therefore, the magnetizing yoke 1 prevents the coil from being pushed out. This improves a product life span and also allows the magnetizing yoke 1 to be partially repairable in an event of breakdown.

In the magnetizing yoke 1, the positioning member 40 includes a shaft 42 disposed upward from the base 2. The shaft 42 is inserted in a through hole 92*b*1 formed in the protrusion 92*b*.

According to the magnetizing yoke 1, the shaft 42 and the through hole 92*b*1 appropriately position the coil cartridge 4 relative to the base 2 and the first segmented core 50. They appropriately prevent the second segmented core 90 (or the edgewise coil 80) from moving inward in a radial direction.

In the magnetizing yoke 1, the hollow shaft 42 is capable of circulating a cooling medium therethrough.

Therefore, the magnetizing yoke 1 achieves, with the shaft 42, functions of positioning the coil cartridge 4, preventing a movement of the coil cartridge 4, and cooling the first segmented core 50 and the coil cartridge 4, thereby reducing the number of parts.

In the magnetizing yoke 1, the positioning member 40 includes a pedestal 41 that defines an end of the shaft 42. The pedestal 41 positions the first segmented core 50 relative to the base 2.

According to the magnetizing yoke 1, the positioning member 40 position the first segmented core 50 and the coil cartridge 4 relative to the base 2, thereby achieving an appropriate magnetizing property as well as reducing the number of parts.

In the magnetizing yoke 1, the insulator 5 includes a tube portion 72 that connects the pair of walls together. The coil is fitted around the tube portion 72. The second segmented core 90 includes a teeth portion 92a that extends from the protrusion 92b and is received in the tube portion 72.

According to the magnetizing yoke 1, the tube portion 72 insulates the coil from the teeth portion 92a, thereby achieving an appropriate magnetizing property.

In the magnetizing yoke 1, the second segmented core 90 includes a flanged wall 91 which extends from the radially inner end of the teeth portion 92a. The pair of walls includes an inner wall and an outer wall positioned radially outside the inner wall. The flanged wall 91 contacts the radially inner wall of the insulator 5. The positioning member 40 prevents the protrusion 92b from moving inward in a radial direction.

According to the magnetizing yoke 1, the flanged wall 91 of the second segmented core 90 appropriately prevents the coil from moving inward in a radial direction.

In the magnetizing yoke 1, the tube portion 72 includes an outer corner having an R-shape.

According to the magnetizing yoke 1, reduction of stress concentration improves the product life span. The coil, which has a shape corresponding to a shape of the tube portion 72, fitted around the tube portion 72, thereby improving a securing performance of the coil.

In the magnetizing yoke 1, the coil is an edgewise coil.

According to the magnetizing yoke 1, a large cross-sectional area of the coil is ensured and allows for a large current flow, thereby achieving an appropriate magnetizing property.

In the magnetizing yoke 1, the coil is covered with a resin between the pair of walls.

According to the magnetizing yoke 1, insulation is appropriately secured between the neighboring coils.

The magnetizing yoke 1 further includes a circuit part 120 configuring a circuit. The coil cartridge 4 includes a terminal 100 attached to an end of the coil. The circuit electrically connects the terminal 100 of the coil cartridge 4 to the neighboring terminal 100 disposed on the neighboring coil cartridge 4. The terminal 100 is detachably attached to the circuit part 120 with a bolt B.

According to the magnetizing yoke 1, facilitation of forming a circuit connecting the coils and exchangeability of the coil cartridge 4 are compatible.

The embodiment of the present disclosure has been described above, but the present disclosure is not limited to this embodiment, and various modifications and variations are also included within a spirit of the present disclosure. For example, the object X to be magnetized is not limited to a rotor of a motor, and the coil is not limited to the edgewise coil 80.

What is claimed is:

1. A magnetizing yoke comprising:
a base;
a set of first segmented cores disposed on the base in a circumference, each of the first segmented cores having a recess portion open inward in a radial direction corresponding to the circumference;
a set of coil cartridges disposed inside the set of first segmented cores in the radial direction, each of the coil cartridges comprising:
an insulator having a pair of walls facing each other in the radial direction;
a coil disposed between the pair of walls; and
a second segmented core including a protrusion received in the recess portion, the insulator, the coil, and the second segmented core being integral with each other; and
a set of positioning members positioning the set of coil cartridges relative to the base,
wherein the set of positioning members prevent the set of coil cartridges from moving inward in radial directions respectively, and
wherein each of the coil cartridges is detachable from an assembly of the base, the first segmented core, and the positioning member.

2. The magnetizing yoke according to claim 1,
wherein each of the positioning members comprises a shaft rising from the base, and
wherein the shaft is inserted in a hole portion formed in the protrusion.

3. The magnetizing yoke according to claim 2,
wherein the shaft is hollow and capable of circulating a cooling medium therethrough.

4. The magnetizing yoke according to claim 2,
wherein each of the positioning members includes a pedestal disposed at a proximal end of the shaft, and
wherein the pedestal positions a first segmented core relative to the base.

5. The magnetizing yoke according to claim 1,
wherein the insulator includes a tube portion that connects the pair of walls together,
wherein the coil is fitted around the tube portion, and
wherein the second segmented core includes a teeth portion that extends from the protrusion and is received in the tube portion.

6. The magnetizing yoke according to claim 5,
wherein the second segmented core includes a flanged wall which extends from a radially inner end of the teeth portion,
wherein the pair of walls includes an inner wall positioned on an inner side of the insulator in the radial direction,
wherein the flanged wall contacts the inner wall of the insulator, and
wherein the positioning member prevents the protrusion from moving inward in a radial direction.

7. The magnetizing yoke according to claim 5,
wherein the tube portion includes an outer corner having an R-shape.

8. The magnetizing yoke according to claim 1,
wherein the coil is an edgewise coil.

9. The magnetizing yoke according to claim 1,
wherein the coil is covered with a resin between the pair of walls.

10. The magnetizing yoke according to claim 1, further comprising:
- a circuit part configuring a circuit,
- wherein each of the coil cartridges includes a terminal attached to an end of the coil,
- wherein the circuit electrically connects the terminal of the coil cartridge to another terminal disposed on another coil cartridge,
- wherein the terminal is detachably attached to the circuit part with a bolt.

* * * * *